Oct. 29, 1968

R. L. WATTERS  3,408,570
WIDE SCALE INDICATOR FOR WEAK CURRENT AMPLITUDES WITHIN
A PREDETERMINED RANGE ABOVE A MINIMUM AMPLITUDE
Filed July 1, 1964

Inventor:
Robert L. Watters,
by John F. Ahern
His Attorney.

United States Patent Office 3,408,570
Patented Oct. 29, 1968

3,408,570
WIDE SCALE INDICATOR FOR WEAK CURRENT AMPLITUDES WITHIN A PREDETERMINED RANGE ABOVE A MINIMUM AMPLITUDE
Robert L. Watters, Schenectady, N.Y., assignor to General Electric Company, a corporation of New York
Filed July 1, 1964, Ser. No. 379,486
3 Claims. (Cl. 324—131)

ABSTRACT OF THE DISCLOSURE

Apparatus for providing an expanded scale indication for current measured by an electrometer utilizes a bias voltage in series opposition with the output signal of the electrometer so that the output signal amplitude must exceed the bias voltage amplitude before an indication is produced on the expanded scale. This insures that the electrometer is operating above its high drift range, enhancing reliability of the expanded scale indication.

---

Figure 1:
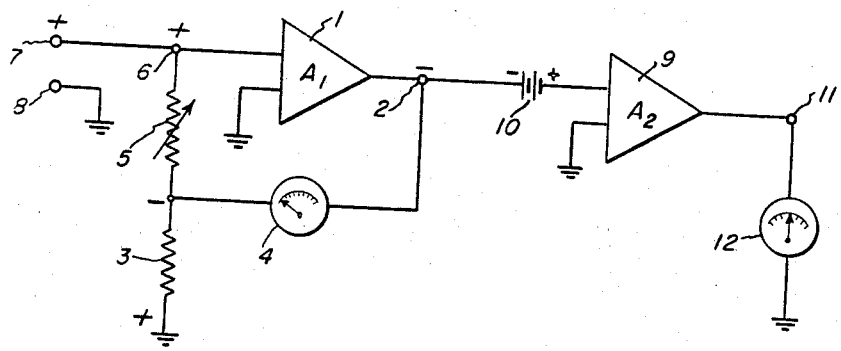

This invention relates to electrical current measuring devices and more particularly concerns such devices capable of indicating extremely small variations in the magnitude of very weak electric currents.

It is frequently highly desirable to provide a current measuring device capable of indicating changes in the magnitude of an extremely weak electric current. For example, such a device is advantageously used to provide a sensitive indication of changes in the ionization rate within an ion gauge tube during the process of finding leaks within an evacuated system. Electrometers have heretofore been used for this purpose and provide amplification of the ion gauge current that normally originates at a source exhibiting an extremely high output impedance. The low levels of current to be measured typically fall within the range from $10^{-12}$ amperes to $10^{-5}$ amperes.

Electrometers suitable for use as measuring devices for low levels of current normally utilize an initial amplification stage, or input stage, having a specially designed electrometer vacuum discharge device featuring an extraordinarily high input impedance. These special devices are limited in their effectiveness by drift that is particularly bothersome when the devices are operated in the low range of their input characteristics. For this reason, prior attempts to amplify the output signal from these special devices beyond the amplification usually provided in electrometer-type amplifiers has proved largely unsuccessful.

It would be highly desirable to provide an additional amplifier for further increasing the sensitivity of measurement with respect to variations in the magnitude of a weak current that has been amplified by an electrometer-type amplifier. The additional amplifying and indicating means advantageously additionally serves to amplify signals within a very small portion of the possible electrometer output signal range to provide an expanded scale indicator. Preferably, the expanded scale indicator does not serve to provide an indication until the electrometer-type amplifier is adjusted so that the input amplifying device operates in the maximum input range of its characteristic, thereby ensuring that the deleterious affect of drift is minimized. In this way, an operator would be unable to mistakenly rely upon expanded scale indications which would be almost as likely to be caused by a spurious drift signal as by changes in magnitude of the current to be measured.

Accordingly, it is an object of my invention to provide an electrical current measuring device featuring more sensitive indication of variations in the strength of a weak electric current.

Another object of my invention is to provide an expanded scale indicator for use with electrometer-type amplifiers.

Still another object of my invention is to provide an electrical current measuring device featuring more reliable indication of variations in the strength of a very weak electric current.

Briefly, in accord with one aspect of my invention I provide additional amplification means coupled to the output of an electrometer-type amplifier. The additional amplification means is effective to provide amplification of an input signal only falling within a narrow range of magnitudes relative to the range of output signal magnitudes from the electrometer-type amplifier. A signal indicator connected to the output of the additional amplification means provides an expanded-scale indication. The additional amplification means is coupled to the output of the electrometer-type amplifier by a source of electric voltage that opposes, or bucks, the output signal of the electrometer-type amplifier throughout the lower portion of the range of output signal magnitudes therefrom. Thus, expanded-scale indication is possible only after the electrometer-type amplifier input has been adjusted to provide an input signal to its initial stage that is substantially equal to the maximum possible input signal thereto. In this way, the effect of drift upon the expanded-scale indication is minimized and an operator is prevented from mistakenly relying upon expanded-scale indications which are unreliable.

Figure 2:
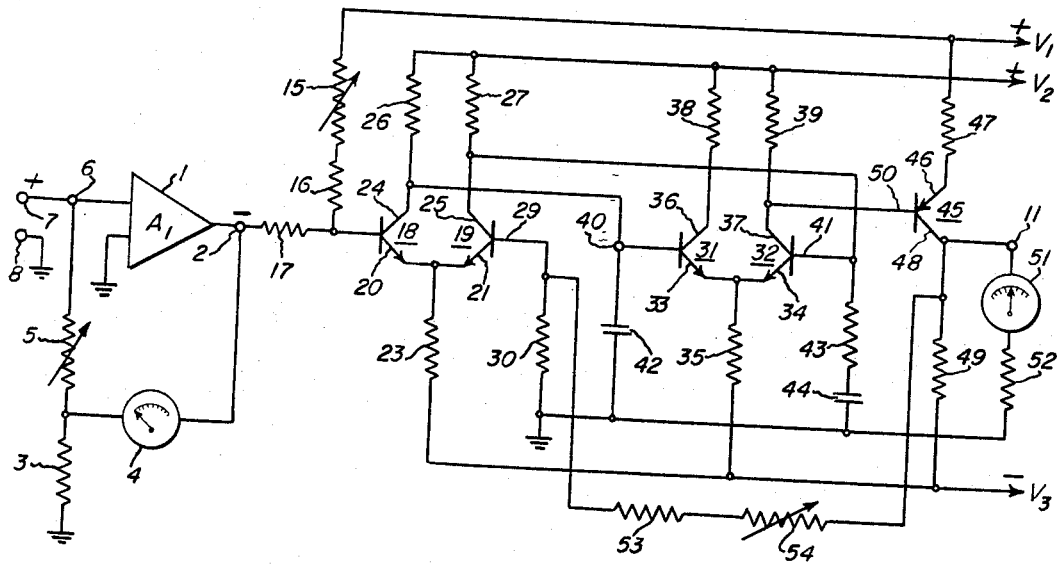

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which:

FIGURE 1 is a block diagram of an electric current measuring system in accord with one embodiment of the invention; and, FIGURE 2 is a schematic circuit diagram of another embodiment of the invention.

The block diagram of FIGURE 1 shows an electrometer including a substantially linear direct current amplifier 1 having an output terminal 2 which is connected to an impedance means, as resistance 3, through a current indicator 4. A feedback resistance 5, that is conveniently selected to be variable, is similarly connected through indicator 4 from amplifier output terminal 2 to amplifier input terminal 6. Electrometer input terminals 7 and 8 are adapted to be connected to a source of current to be measured.

The electrometer input means, including variable resistance 5 and resistance 3, permits adjustment of the magnitude of input signal applied to the initial stage of electrometer-type amplifier 1 in response to current applied to input terminals 7 and 8. In some cases vernier adjustment is advantageously gained by selecting resistance 3 to be variable also.

A direct current scale-expander amplifier 9 is coupled to the output of amplifier 1 by coupling means including a source of substantially constant bucking voltage, indicated schematically as battery 10. Output terminal 11 of amplifier 9 provides the source of energy for indicator 12.

Amplifier 1 is selected to provide a high power gain, preferably in excess of 100, so that the ratio of current through current indicator 4 to the current at input terminals 7 and 8 is substantially independent of the power gain of amplifier 1 and depends upon the resistance value of resistance 5, conveniently a resistor, and the resistance value of resistance 3, also conveniently a resistor. The feedback path including resistor 5 introduces negative feedback from amplifier output terminal 2 to amplifier input terminal 6. To this end, amplifier 1 is selected to provide a complete phase reversal, or inversion, between its input and output, in a manner well-known in the art.

By selecting resistor 5 to be many orders of magnitude greater in resistance value than resistor 3, the current flowing through indicator 4 is made a corresponding magnitude greater than the order of current at terminals 7 and 8. The current flowing through indicator 4 is essentially equal to the input current multiplied by the resistance ratio between resistance 5 and resistance 3. Frequently, a plurality of input current ranges are advantageously provided by having a plurality of resistors of differing resistance values and a suitable high impedance switch having good insulation to selectively insert a resistance 5 (and/or 3) of a particular desired value corresponding to a desired range. This is, of course, an alternative to providing a variable resistance 5, or can be used in combination therewith. In this way, the ratio between the input current at terminals 7 and 8 and the current through indicator 4 can be varied to provide a large number of ranges with a single amplifier 1 and indicator 4.

Amplifier 1 can be any of a plurality of well-known direct current linear amplifiers and a particularly advantageous selection is the amplifier circuit described and illustrated in FIGURE 4 of my copending application, Ser. No. 297,027, filed July 23, 1963, now Patent No. 3,320,532 issued May 16, 1967, and assigned to the assignee of the present invention. Amplifier input terminal 6 and output terminal 2 of that amplifier correspond to the similarly designated terminals shown in FIGURE 1 and described above.

In accord with the present invention, direct current expander-amplifier 9 is adapted to receive an input signal within a range that extends over less than one-fourth, and preferably equal to one-tenth, of the maximum range of output signal magnitude of the electrometer amplifier. The signal-bucking coupling means then includes a source 10 of substantially constant voltage having a magnitude equal to at least three-fourths, and preferably nine-tenths, of the maximum magnitude of output signal obtainable from the electrometer amplifier. The afore-mentioned substantially constant voltage is connected to oppose the voltage output of the electrometer amplifier.

With many electrometer amplifiers, the voltage excursion at output terminal 2 is typically from one to ten volts. In this case, amplifier 9 is selected to accommodate input signals of less than 2.5 volts, and preferably approximately equal to 1.0 volt. The source of opposing, or bucking, voltage 10 is selected to have a magnitude greater than 7.5 volts, and preferably approximately equal to 9 volts.

The input impedance of amplifier 9 is advantageously selected to be at least one order of magnitude greater than the resistance value of resistance 3 in order to avoid introducing an error into the indication provided by indicator 4. This is normally readily achieved because the effective output impedance of a negative feedback electrometer amplifier is generally approximately 10 ohms. In cases where it is not convenient to select an amplifier 9 having an appropriately high input impedance a diode can be used in series with the coupling means and connected to oppose conduction in the direction which current would otherwise pass due to source 10. In such case, the diode becomes highly conductive, or is forward biased, whenever the voltage at terminal 2 exceeds the voltage of source 10 but accuracy of measurement is retained otherwise. It should be noted, that current flow through the input of amplifier 9 in no way adversely affects the accuracy of the reading of indicator 4, as long as the gain of amplifier 1 is large and the input impedance of amplifier 9 is great relative to the impedance of resistance 3.

In operation, when an expanded scale reading is desired from indicator 12, the resistance value of resistance 5 is increased until the input signal present at the input of amplifier 9 is shown by a response of indicator 12. No response is had from indicator 12 until the output voltage at terminal 2 has raised to a value approximately equal to the voltage magnitude of source 10. Consequently, the operator is required to adjust resistance 5 to approximately its maximum resistance value for which the electrometer is operative with a particular given strength of input current to terminals 7 and 8. This ensures that the electrometer electron discharge device (required as the input stage for electrometer amplifier 1) be operated near the maximum of its input characteristics so that the output signal component caused by an input signal is much larger in magnitude than the component caused by drift.

When indicator 12 is a meter, the system of FIGURE 1 readily provides an expanded scale indication wherein the needle traverses the entire meter face for variations in input current that are completely undetected by observing the response of indicator 4. In addition, needle movement caused by extraneous signals are minimized by requiring that expanded scale operation be obtained only through adjustment of the electrometer amplifier to operate with maximum input signal.

FIGURE 2 illustrates a measuring device as shown in FIGURE 1, but having a detailed schematic circuit diagram of a particular specific amplifier 9 that I have found to be particularly suitable for use in accord with my invention. Similar elements of the two figures have been similarly designated. It is to be understood that the detailed schematic circuit diagram is illustrated merely for the purpose of aiding those skilled in the art in the practice of my invention and it is not intended that the present invention should be limited to the specific circuit chosen for purpose of explanation.

In FIGURE 2 the voltage source 10 of FIGURE 1 has been replaced by a resistance voltage divider network including series-connected resistances 15, 16 and 17 that are connected from a source $V_1$ of positive voltage to output terminal 2 of amplifier 1. It will be appreciated that it is frequently advantageous to replace batteries and the like with other circuit means whenever possible.

A first amplifier stage includes NPN transistors 18 and 19 having their respective emitters 20 and 21 connected to a suitable source $V_3$ of negative potential by a resistance 23. Collectors 24 and 25 of transistors 18 and 19 are connected by respective resistances 26 and 27 to source $V_2$ of positive potential. The base 28 of transistor 18 is connected to the junction of resistance 16 and resistance 17 and base 29 of transistor 19 is connected through resistance 30 to ground, or the point of zero reference potential for the circuit.

Additional amplification is provided by a second amplifying stage comprising NPN transistors 31 and 32 having their respective emitters 33 and 34 connected through a resistance 35 to the negative source $V_3$ of voltage. Collectors 36 and 37 of transistors 31 and 32 are connected by respective resistances 38 and 39 to the source of positive potential $V_2$. Base 40 of transistor 31 is connected to collector 24 such that increased conduction of transistor 18 results in decreased conduction of transistor 31 and vice versa. Similarly, base 41 of transistor 32 is connected to collector 25 in such a manner that increased conduction of transistor 19 results in decreased conduction of transistor 32 and vice versa. Stability is provided by a capacitance 42 connecting base 40 to ground and a network including series connected resistance 43 and capacitance 44 that connect base 41 to ground.

The final stage of amplifier 9 comprises a PNP transistor 45 having its emitter 46 connected to positive voltage source $V_1$ by resistance 47. Collector 48 of transistor 45 is connected to the negative source $V_3$ of voltage by resistance 49. The input signal to the final stage is provided by connecting base 50 of transistor 45 to collector 37 of transistor 32. Output terminal 11 is connected to collector 48. An indicator 51, corresponding to indicator 12 of FIGURE 1, is connected in series with a resistance 52 from ground to terminal 11 and provides an indication of the strength of the output signal of amplifier 9. A variable negative feedback loop is provided by series connected resistance 53 and variable resistance 54 connected from collector 48 to base 29.

During operation below the threshold level at which expanded scale readings are obtainable, transistors 18 and 32 conduct heavily and transistors 19, 31 and 45 are essentially non-conducting. The threshold level is predominantly determined by the magnitude of voltage $V_1$ and by the ratio of the resistance value of resistance 17 to the summation of resistance values of resistances 15, 16 and 17. The threshold level is exceeded whenever the absolute magnitude of voltage from terminal 2 to ground is about equal to or greater than this resistance ratio multiplied by the algebraic difference in potential between voltage source $V_1$ and terminal 2.

When the threshold level is exceeded (i.e., the output voltage of terminal 2 makes a negative excursion of greater than the predetermined magnitude), base 28 of transistor 18 assumes a negative potential with respect to ground and transistor 19 commences to conduct as required to ensure that emitter 21 thereof does not vary substantially from ground potential. The latter conduction occurs because base 29 of transistor 19 is connected to ground by resistance 30, that is preferably selected to exhibit a low resistance value. In this way, all of the transistors shown in FIGURE 2 enter their respective amplification regions and extremely small variations in the voltage between terminal 2 and ground provide a large response from indicator 51. In a typical case, amplification factors well in excess of 100 are readily obtainable from an amplifier as shown in FIGURE 2.

One particularly desirable expanded scale amplifier as shown in FIGURE 2 utilized the following specific elements:

| | |
|---|---|
| R–15 | 10KΩ, multi-turn variable. |
| R–16 | 300Ω. |
| R–17 | 120KΩ. |
| R–23 | 30KΩ. |
| R–26 | 51KΩ. |
| R–27 | 120KΩ. |
| R–30 | 120KΩ. |
| R–35 | 200Ω. |
| R–38 | 39KΩ. |
| R–39 | 27KΩ. |
| R–43 | 51KΩ. |
| R–47 | 100Ω. |
| R–49 | 200Ω. |
| R–52 | 10KΩ. |
| R–53 | 18KΩ. |
| R–54 | 10KΩ. |
| C–42 | 100KΩ., variable. |
| C–44 | 0.1 μfd. |
| T18, 19, 31, 32 | 1.0 μfd. |
| T–45 | 2N2349 |
| $V_2$ | 2N1175 |
| $V_1$ | +20 volts. |
| | +10 volts. |
| $V_3$ | −20 volts. |
| M51 | 50–0–50 μa. |

When the above expanded scale amplifier was used with the electrometer amplifier of FIGURE 4 in my aforementioned copending application (modified by omitting the four protective diodes designated 1696's), a change of 0.1 percent in ion current produced a full scale deflection on the expanded scale meter and the signal-to-noise was in excess of 5. The threshold level was about equal to −9 volts and expanded scale readings were obtained from about −9 volts to about −10 volts. This required that the electrometer input network be adjusted to provide operation of the input stage near the maximum input range where optimum reliability of indication was obtained. The amplification factor of the expanded-scale amplifier was readily varied from 50 to 500 by adjusting variable resistance 54.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. An expanded-scale current indicating system comprising: a direct current feedback electrometer amplifier having output means, a feedback path and variable impedance input means adapted to be connected to a source of current to be measured; a first meter means in the feedback path; a direct current scale-expander amplifier having input means and output means, said output means coupled to second meter means responsive to variations in the magnitude of current applied thereto; and coupling means including a source of substantially constant magnitude bucking bias connecting the output of said electrometer amplifier to the input of said scale-expander amplifier and providing a threshold signal magnitude below which expanded scale operation is precluded.

2. The system of claim 1 wherein the magnitude of said bucking bias is approximately equal to at least nine-tenths of the maximum output signal magnitude obtainable from said electrometer amplifier.

3. A system for indicating the magnitude of a weak direct current, said system comprising:
   (a) a direct current feedback electrometer amplifier having, input means adapted to be coupled to a source of weak direct current, a feedback path, and output means providing an inverted amplified electric signal similar in waveform to said weak direct current, said input means including a variable impedance network permitting adjustment of the magnitude of input signal applied to the initial stage of said electrometer amplifier in response to said weak direct current;
   (b) a first signal indicator in the feedback path;
   (c) a direct current scale-expander amplifier having input means adapted to receive an input signal within a range that extends over less than one-fourth of the maximum range of output signal magnitude of said electrometer amplifier, said scale expander amplifier providing an amplified output signal to a second signal indicator corresponding in waveform to the input signal waveform applied thereto; and,
   (d) coupling means connected from the output of said electrometer amplifier to the input of said scale-expander amplifier, said coupling means including a source of substantially constant bucking voltage having a magnitude equal to at least three-fourths of the maximum magnitude of voltage obtainable from said electrometer amplifier so that said electrometer amplifier must be operated near its maximum input range when an expanded scale indication is obtained.

References Cited

UNITED STATES PATENTS

| | | | |
|---|---|---|---|
| 2,229,009 | 1/1941 | Berry | 324—131 XR |
| 2,269,227 | 1/1942 | Rowell | 324—131 XR |
| 2,481,500 | 9/1949 | Crowl | 324—131 XR |
| 2,497,961 | 2/1950 | Shaw | 324—131 XR |
| 2,802,181 | 8/1957 | Gorski | 324—131 XR |
| 2,988,699 | 6/1961 | Gardner | 324—123 XR |
| 3,090,916 | 5/1963 | Gill | 324—131 XR |

RUDOLPH V. ROLINEC, *Primary Examiner.*

E. F. KARLSEN, *Assistant Examiner.*